United States Patent [19]
Jenkins et al.

[11] Patent Number: 5,396,570
[45] Date of Patent: Mar. 7, 1995

[54] OPTICAL DEVICE FOR BEAM SPLITTING, MIXING AND RECOMBINATION FUNCTIONS

[75] Inventors: Richard M. Jenkins; Robert W. Devereux, both of Worcester, United Kingdom

[73] Assignee: The Secretary of State for Defence in Her Britannic Majesty's Government of the United Kingdom of Great Britain and Northern Ireland, London, United Kingdom

[21] Appl. No.: 64,025

[22] PCT Filed: Dec. 2, 1991

[86] PCT No.: PCT/GB91/02132
§ 371 Date: May 19, 1993
§ 102(e) Date: May 19, 1993

[87] PCT Pub. No.: WO92/11555
PCT Pub. Date: Jul. 9, 1992

[30] Foreign Application Priority Data

Dec. 20, 1990 [GB] United Kingdom ............... 9027659

[51] Int. Cl.⁶ .................................................. G02B 6/26
[52] U.S. Cl. ........................................ 385/28; 385/46; 385/146
[58] Field of Search ............. 372/6; 385/28, 33, 34, 385/35, 45, 46, 50, 88, 89, 90, 91, 92, 93, 94, 146, 900

[56] References Cited
U.S. PATENT DOCUMENTS

| | | | |
|---|---|---|---|
| 3,750,183 | 7/1973 | Drabowitch | 343/786 |
| 3,832,029 | 8/1974 | Bryngdahl | 385/133 |
| 4,060,309 | 11/1977 | Le Noane et al. | 385/93 |
| 4,087,159 | 5/1978 | Ulrich | 385/129 |
| 4,150,870 | 4/1979 | d'Auria | 385/45 |
| 4,950,045 | 8/1990 | Bricheno et al. | 385/24 |
| 4,975,237 | 12/1990 | Brown | 356/338 |
| 5,239,598 | 8/1993 | Wight et al. | 385/8 |
| 5,270,792 | 12/1993 | Snyder | 356/353 |

FOREIGN PATENT DOCUMENTS

| | | |
|---|---|---|
| 0330457A3 | 8/1989 | European Pat. Off. . |
| 0330539 | 8/1989 | European Pat. Off. . |
| 0395060 | 10/1990 | European Pat. Off. . |
| 2634288 | 1/1990 | France . |
| 1525492 | 9/1978 | United Kingdom . |
| 2207525 | 2/1989 | United Kingdom . |

OTHER PUBLICATIONS

Bryngdahl; *Journal of the Optical Society of America*, vol. 63, No. 4, 4/73; pp. 416–419.
Fielding et al.; European Conference on Optical Communications, 1989; pp. 17–21.

(List continued on next page.)

*Primary Examiner*—Rodney B. Bovernick
*Assistant Examiner*—John Ngo
*Attorney, Agent, or Firm*—Nixon & Vanderhye

[57] ABSTRACT

An optical device (10) incorporates a rectangular multimode waveguide (14) with an input aperture (22), and two output optical fibres (26 and 28) with respective input apertures (30 and 32). An input light beam (34) of Gaussian transverse intensity profile is focused to a beam waist (36) at the center of the aperture (22). The beam phase and waist radius w are arranged such that the light beam (34) excites symmetric modes in the waveguide (14). Modal dispersion along the waveguide (14) producestwo electric field intensittlVxima of similar magnitude centered on the fibre input apertures (30 and 32). This provides the beamsplitter function of division of input radiation into two similar intensity outputs. Devices of the invention may be arranged to divide input beams into more than two output beams. The invention may also provide a light beam combiner.

12 Claims, 9 Drawing Sheets

OTHER PUBLICATIONS

Ikegami et al.; *Physics World*, 91/91; "Passive Paths for Networks" pp. 50–54.

Jansen et al.; *Applied Physics Letter* 55 (19), 11/89; "Diffraction–limited Operation from monolithically integrated diode laser array and self-imaging (Talbot) cavity"; pp. 1949–1551.

Simon et al.; Applied Physics Letters, vol. 31, No. 2, 7/77; "Fiber-optical interferometer"; pp. 77–79.

Niemeier et al.; Optics Letters, vol. 11, No. 10, 10/90; "Quadrature outputs from fiber interferometer with 4×4 coupler"; pp. 677–679.

Croston et al.; IEEE Photonics Technology Letters, vol. 2, No. 10, 10/90; "A Highly Dispersive Wavelength Division Demultiplexer in In GaAlAs-InP for 1.5 μm Operation"; pp. 734–737.

Microwave Journal, vol. 9, no. 1, Jan. 1966, Dedham U.S., PP. 41–51; Drabowitch S.W.: 'Multimode Antennas' see the whole document.

Applied Optics, vol. 15, No. 5, May 1976, New York, U.S. pp. 1334–1340' Laakmann K. D. et al.: 'Waveguides: et al.' p. 1334; FIG. 1–4 see page 1337.

OPTICAL DEVICE FOR BEAM SPLITTING, MIXING AND RECOMBINATION FUNCTIONS

BACKGROUND OF THE INVENTION

1. Field of the Invention

This invention relates to an optical device. More particularly it relates to devices for performing one or more of the functions of beamsplitting, recombination or mixing, and to devices employing such functions.

2. Discussion of Prior Art

Optical devices which accept input light beams and perform beamsplitting, recombination or mixing functions are known in the prior art. Such devices include beamsplitters and prisms, which divide one inputbeam into two or mix two input beams to produce two mixed output beams. These are bulk components suitable for use in free space optics; they suffer from stability, bulk and cost limitations, and are not easily applicable to integrated optics.

Optical devices for beamsplitting etc may also be constructed from optical fibres. These may for instance be fused fibre couplers, or directional couplers. Like bulk components, such fibre components suffer from limitations in their applicability to integrated optics. In addition efficiency of injection of light beams into the fibres is generally low and the efficiency of splitting or recombination is generally low. Typical splitting losses in fused fibre couplers are 75%.

A variety of devices for beamsplitting and related functions is also known in planar waveguide technology. These are more readily applicable to integrated optics than bulk and fibre optic devices. They are mostly based on Y-junctions, in which efficiency of splitting or recombination is low. Injection of light beams into these devices is normally inefficient, as is the case for fibre optic components.

In "Passive Paths for Networks", Physics World, September 1991, pp 50–54 T. Ikegami and M. Kawachi briefly discuss the forms of devices described above, in isolation from considerations of input to them.

Due to the increasing importance of optical networks and integrated circuits, much work has been undertaken to improve the efficiency of splitting and recombination in fibre or planar waveguide Y-junctions and associated devices. Some workers, such as Z. Weissman, A. Hardy and E. Marom in IEEE Journal of Quantum Electronics, Vol 25, No 6 (1989) pp 1200–1208, have considered basic modes propagating within the devices. However, they found that splitting efficiency was still heavily dependent on the angle within the Y-junction, and was reduced to 20% at 7°. Other workers have developed active Y-junctions; one such is described by H. Sasaki and I. Anderson in "Theoretical and Experimental Studies on Active Y-Junctions in Optical Waveguides", IEEE Journal of Quantum Electronics Vol QE-14, No. 11 (1978) pp 883–892. These authors found that efficiency fell off rapidly with increasing split angle between Y-junction outputs, and was only 20% at a split half angle of 3°.

Asymmetric Y-junctions are also known. One such device, using total internal reflection to achieve higher efficiency at the split, is described by K. Shirafuji and S. Kurazono in "Transmission Characteristics of Optical Asymmetric Y-Junction with Gap Region", Journal of Lightware Technology Vol 9, No. 4 (1991) pp 426–429.

All three references discuss the operation of the respective devices and do not consider input to them.

Other forms of optical devices for beamsplitting etc. are also known in planar waveguide technology, such as combinations of Y-junctions forming more complex devices and star couplers. There is, however, an unfulfilled need for optical devices which accept input beams and perform efficient beamsplitting, recombination or mixing. In particular there is a need for such devices which are readily applicable to integrated optical circuits.

SUMMARY OF THE INVENTION

It is an object of the invention to provide an alternative form of optical device for accepting input radiation from free space and for performing at least one of the following functions: beamsplitting, recombination or mixing.

The present invention provides an optical device including input means for providing input radiation and a waveguide arranged to receive the input radiation and to provide for at least a proportion of the input radiation to be directed to output means, characterised in that:

(a) the input means are arranged to provide at least one input radiation beam of Gaussian intensity profile directed to an input region of the waveguide, and (b) the waveguide is a multimede waveguide, and the dimensions of the waveguide together with the position and phase characteristics of the at least one input radiation beam are in combination arranged to provide for the at least one input radiation beam to be directed to the output means by virtue of modal dispersion along the path of radiation guided within the waveguide.

For the purposes of this specification, the expression "Gaussian intensity profile" applied to a radiation beam means that beam intensity I is equal to $I_o \exp(-2w/r)$, where $I_o$ is radiation intensity at a central maximum, r is distance orthogonal to radiation propagation from that central maximum to the point at which I occurs, and w is a beam width radius parameter.

The invention provides the advantage that it accepts input radiation with Gaussian beam profile and, depending on the embodiment employed, will perform with high efficiency at least one of the functions of splitting, recombination and mixing. Tests indicate that efficiency of 75% or more is attainable for one to two way splitters of the invention. This compares favourably with inherent splitting losses of 6 dB, equivalent to 75%, (25% efficiency) in prior art Y-junctions. This latter figure does not include insertion losses whilst that for the invention does. The invention also has the advantage that it may be constructed in layer structure technologies. These include hollow alumina waveguides for $CO_2$ laser radiation and ridge waveguides formed of semiconductor materials for near infrared radiation (eg. Nd-YAG laser radiation).

The invention may include input means comprising beam waist defining means arranged to match the input radiation beam or beams to the input region of the waveguide. The beam waist defining means may be a lens.

Devices of the invention may incorporate a waveguide of rectangular cross-section 2b by 2a where b is greater than a. The input means may be arranged to match the Gaussian profile input beam or beams to the waveguide input region such that the ratio of beam radius w to waveguide half height a is in the range 0.47 to 1.07. Alternatively the ratio w/a may be in the range 0.54 to 0.92.

Devices of the invention for performing beamsplitting functions may have input means arranged to provide a single input radiation beam. In such a device the input beam may be centrally located with respect to the input region to produce symmetric excitation of the waveguide. This has the advantage that only symmetric (ie odd numbered) $EH_{mn}$ modes of the waveguide are excited. It has been shown practically that devices requiring only odd-numbered $EH_{mn}$ modes to be supported are less sensitive to errors in dimension of the waveguide than devices requiring both odd and even numbered modes. Engineering tolerances may therefore be relaxed and sensitivity to temperature change is reduced.

Devices of the invention may be constructed in which the input means are arranged to provide two or more input radiation beams of Gaussian profile.

The waveguide may be connected to output means comprising one or more subsidiary waveguides. Alternatively the output means may be arranged to provide one or more free space beams of Gaussian intensity profile. In another alternative the output means may comprise one or more active devices such as detectors.

BRIEF DESCRIPTION OF THE DRAWINGS

In order that the invention may be more fully understood, embodiments thereof will now be described, by way of example only, with reference to the accompanying drawings, in which:

FIG. 5 shows field amplitude distributions in a square waveguide for various ratios of input Gaussian beam waist radius w to waveguide half width a;

DETAILED DISCUSSION OF PREFERRED EMBODIMENTS

Figure 1:
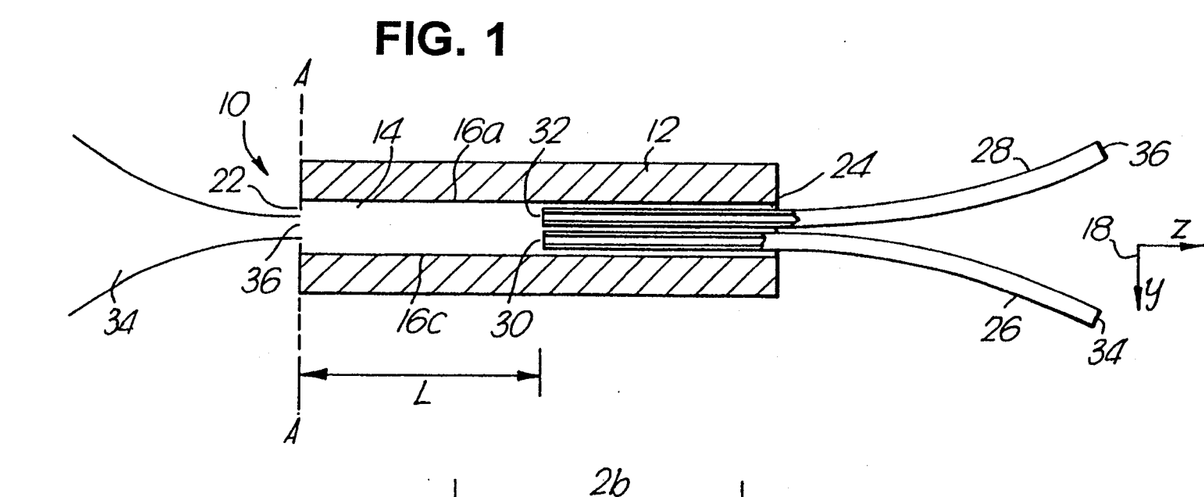
FIG. 1 is a sectional plan view of an optical device of the invention in the form of a beamsplitter.
Figure 2:
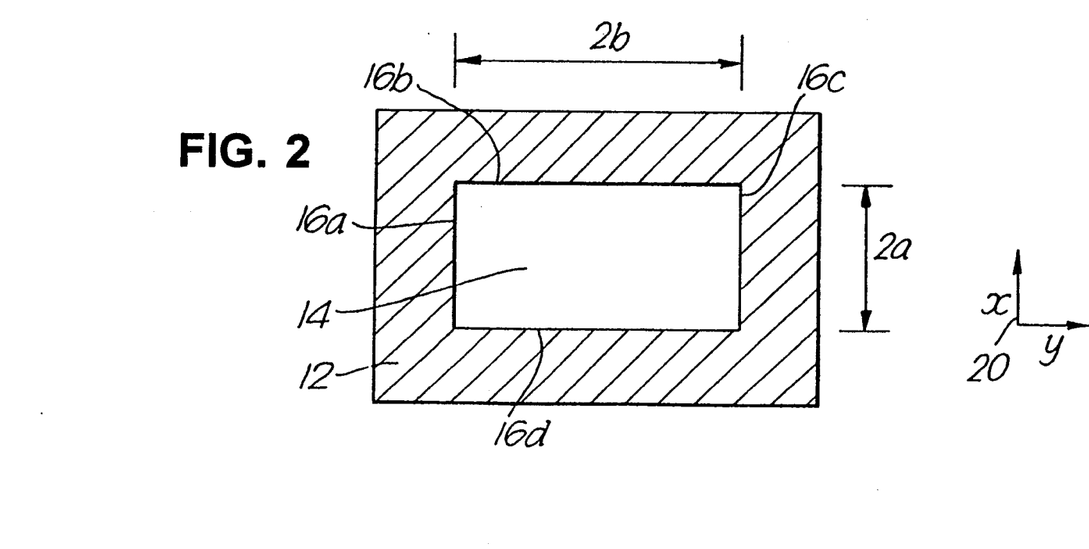
FIG. 2 is a transverse sectional view of the FIG. 1 device.

Referring to FIGS. 1 and 2, there are shown sectional views of an optical device of the invention in the form of a beamsplitter indicated generally by 10. The beamsplitter 10 incorporates a rectangular block 12 with a rectangular cross-section hole running through it to define a rectangular waveguide indicated generally by 14. The waveguide 14 has constant rectangular cross-section and reflecting walls 16a to 16d; it is of height 2a, width 2b and active length L, these dimensions being respectively parallel to x, y and z Cartesian co-ordinate axes indicated by 18 and 20. Of these, x is referred to as vertical and y and z as horizontal, for ease of expression. The origin of the co-ordinate system is defined, for the purpose of this specification, to be such that dashed line A-A in FIG. 1 indicates the plane $z=0$, and walls 16a to 16d lie in planes $y=-b$, $x=+a$, $y=+b$ and $x=-a$ respectively. The waveguide 14 has an input aperture 22 in the plane $z=0$, and an output aperture 24 in the plane $z=2L$.

The parameters a, b and L are employed to preserve generality, specific values will be described later. However, in this example $b>2a$.

The beamsplitter 10 also incorporates two hollow core optical fibres 26 and 28 acting as beamsplitter outputs. The fibres 26 and 28 have input apertures 30 and 32 arranged in the waveguide 14 such that their centres are located at $x=0$, $y=+b/2$, $z=L$ and $x=0$, $y=-b/2$, $z=L$ respectively. The fibres also have output apertures 33 and 35 respectively. The fibres 26 and 28 are supported by the waveguide 14 from $z=L$ to $z=2L$.

The operation of the beamsplitter 10 will now be described in general terms, a more detailed theoretical analysis will be given later. A laser light source (not shown) is arranged to provide a coherent light beam 34, linearly polarised in the horizontal plane. The beam 34 has a wavelength $\lambda$ equal to $2b^2/L$. The beam 34 is a $TEM_{oo}$ free space mode; it has a beam waist 36, of Gaussian profile, and of diameter $2w$, positioned with its center at the point $x=0$, $y=0$, $z=0$ which is in the center of the waveguide input aperture 22. For illustrational clarity, convergence of the beam 34 to its waist 36 is shown on an exaggerated scale. As is conventional, the beam waist diameter $2w$ is measured across the laser beam central intensity maximum between points at which intensity is a fraction $1/e^2$ of maximum intensity, e being the base of natural logarithms. The diameter $2w$ of the beam waist 36 is chosen such that it would efficiently couple to a fundamental mode $EH_{11}$ in a square waveguide of cross-section $2a$ by $2a$. The beam waist 36 may be adjusted to the required diameter by use of a lens of appropriate focal length. The beam 34 excites symmetric modes $EH_{1n}$ (n odd) of the rectangular waveguide 14, which is a multimode device in the horizontal transverse, or y, direction. In the vertical, or x, direction it operates in the fundamental mode only. Antisymmetric modes (n even) of the multimode waveguide 14 are not excited, because the input is (a) coaxial, (b) a close approximation to a fundamental mode of a square waveguide of side $2a$ and (c) of constant phase across the input aperture 22. The Gaussian ($TEM_{oo}$)

electric field distribution of the beam 34 is decomposed in the waveguide 14 into a linear combination of the $EH_{1n}$ waveguide modes. The $EH_{1n}$ modes have different propagation constants in the z direction, along the $x=0$, $y=0$ axis, within the waveguide 14. In consequence, the field distribution in planes parallel to the $z=0$ plane varies in the z direction. As a result of this variation, the field distribution in the plane of the input aperture 22 becomes converted aloe the active length L of the waveguide 14 to two like field distributions a respective entrance apertures 30 and 32 of the fibres 26 and 28. These distributions are centered on respective fibre aperture centres at $x=0$ $y=+b/2$, $z=L$ and $x=0$, $y=-b/2$, $z=L$.

Each of the field distributions at apertures 30 and 32 excites a fundamental mode of the respective fibres 26 and 28. Radiation in the rectangular waveguide 14 is therefore coupled efficiently into the output fibres 26 and 28. The beamsplitter 10 therefore divides an input beam 34 applied to the rectangular waveguide 14 into two output beams emergent from the fibres 26 and 28. It does so because the mode structure of the rectangular waveguide 14 converts a single approximately fundamental mode field distribution at an input aperture 22 into two separate similar distributions after a distance L. This is a specific example of a more general phenomenon, and arises because of the on-axis plane wave excitation of the rectangular waveguide 14 and the aforesaid relationship between the waveguide length L and the wavelength $\lambda$ given by:

$$L = 2b^2/\lambda \qquad (1)$$

where b is the half width of the waveguide 14.

As will be described later, changes in the waveguide length L and in the phasing, location and form of the input to the waveguide 14 alter the radiation division effects.

The theoretical propagation characteristics of a rectangular waveguide will now be analysed. It is assumed that the waveguide has height $2a$, width $2b$ and is bounded by a homogeneous dielectric material with complex dielectric constant $\epsilon$. It is also assumed that this dielectric material (which provides the waveguide walls) is highly reflecting and not significantly attenuating for required propagating modes. The waveguide has height, width and length dimensions which are parallel to the x, y and z axes respectively. It has normalised linearly polarized modes of the kind $EH_{mn}$. The electric field contribution $E_{mn}(x,y,z)$ of the $mn^{th}$ mode $EH_{mn}$ at the point (x,y,z) has been calculated by Laakmann et al in Appl. Opt. Vol. 15, No. 5, pages 1334–1322, May 1976 as follows:

$$E_{mn}(x,y,z) = \frac{1}{\sqrt{(ab)}} \left[ \begin{array}{c} \cos \\ \sin \end{array} \left( \frac{m\pi x}{2a} \right) \right] \left[ \begin{array}{c} \cos \\ \sin \end{array} \left( \frac{n\pi y}{2b} \right) \right] e^{i\gamma_{mn}z} \qquad (2)$$

where
- m is the mode number relating to the field dependency along the x axis,
- n is the mode number relating to the field dependency along the y axis,
- z is the distance along the z axis,
- $Y_{mn} = (\beta_{mn} + i\alpha_{mn})$, the propagation constant of the $mn^{th}$ mode, $\beta_{mn}$ and $\alpha_{mn}$ being the $mn^{th}$ mode's phase and attenuation coefficients, and "cos" above "sin" indicates the former applies to odd mode numbers (m or n as appropriate) and the latter to even mode numbers.

The phase coefficient $\beta_{mn}$ is given by:

$$\beta_{mn} = \frac{2\pi}{\lambda} \left[ 1 - \left\{ \left( \frac{\lambda m}{4a} \right)^2 + \left( \frac{\lambda n}{4b} \right)^2 \right\} \right]^{\frac{1}{2}} \qquad (3.1)$$

If the negative term in parenthesis in Equation (3.1) is small compare with unity (paraxial radiation approximation), which is satisfied in practice, then the binomial theorem may he used to rewrite Equation (3.1) as:

$$\beta_{mn} = \frac{2\pi}{\lambda} \left[ 1 - \frac{1}{2} \left\{ \left( \frac{\lambda m}{4a} \right)^2 + \left( \frac{\lambda n}{4b} \right)^2 \right\} \right] \qquad (3.2)$$

where a, b, m and n are as previously defined, and k is the wavelength of the radiation propagating in the waveguide.

Equation (2) sets out the electric field contributions obtainable from all linearly polarized modes of a rectangular waveguide. It is calculated on the basis that the electric field contribution of each mode is zero at the side walls 16a and 16c of the waveguide, ie at $y=+b$ and $-b$. This is satisfied if the waveguide 14 has reflecting side walls 16.

In the case of the beamsplitter 10 of FIGS. 1 and 2, as previously mentioned, the input radiation beam waist radius w is chosen such that it would efficiently excite a fundamental $EH_{11}$ mode in a square section waveguide of side $2a$. This is now described in more detail.

Figure 3:
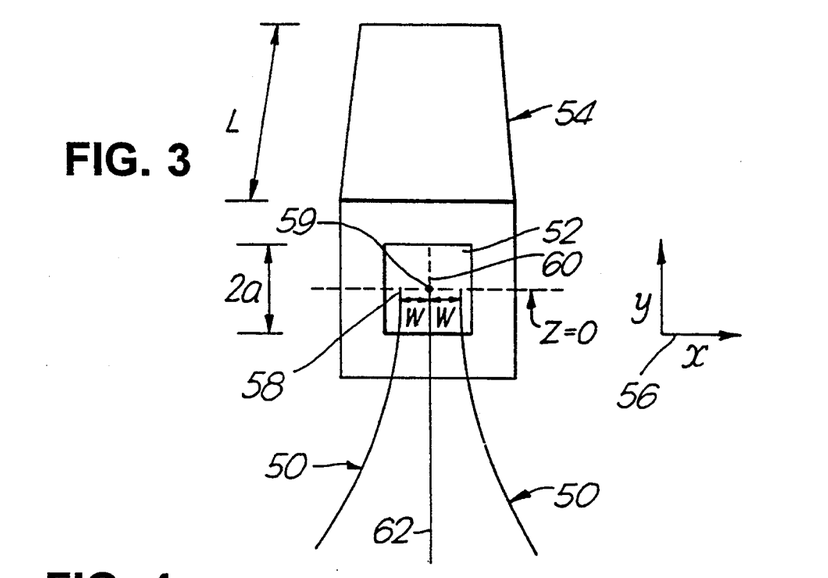
FIG. 3 is a schematic perspective view of a Gaussian profile light beam incident on a square section waveguide input aperture.

Referring now to FIG. 3, there is shown a schematic view of a Gaussian intensity profile light beam 50 incident on an input aperture 52 of a square section waveguide 54. The waveguide 54 has internal height and width equal to $2a$ and parallel to co-ordinate axes y and x respectively as indicated at 56. The input aperture 52 is in the plane $z=0$. The light beam 50 has a waist 58 of radius w also located in the plane $z=0$. The aperture 52 and waist 58 have a common center at 59. The waveguide 54 and light beam 50 have central longitudinal axes 60 and 62 respectively, these being coaxial with one another and with the z axis on the line $x=0$, $y=0$.

Figure 4:
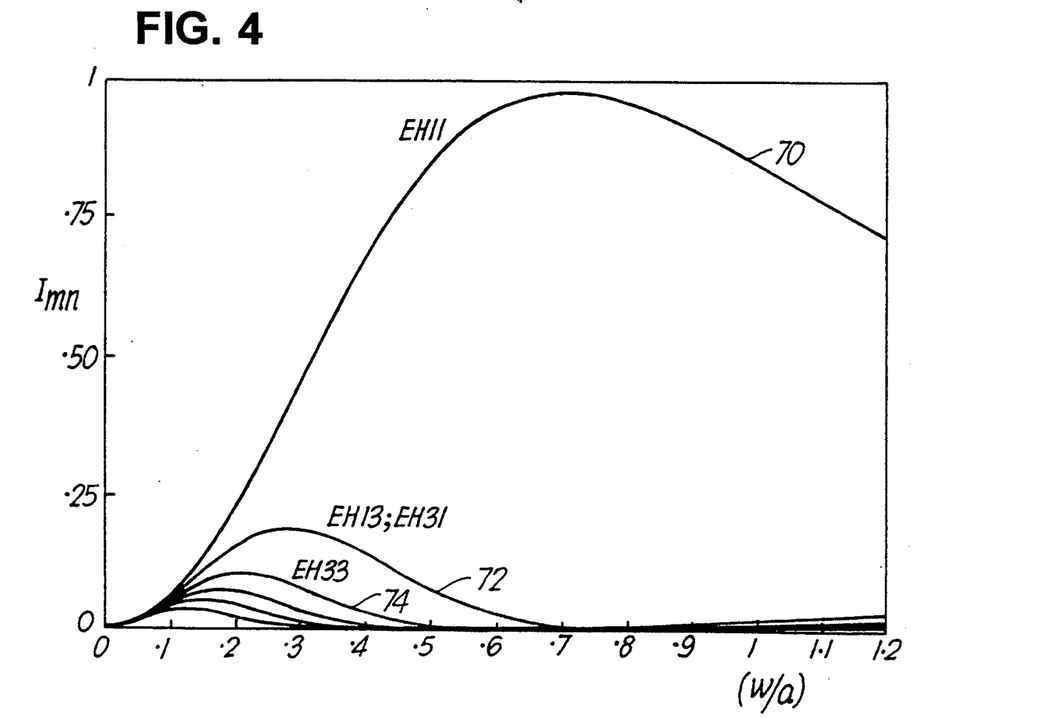
FIG. 4 illustrates graphically the variation of intensity coupling coefficients, for several square waveguide $EH_{mn}$ modes, with variation in ratio of beam waist radius to waveguide half width.
Figure 5A:
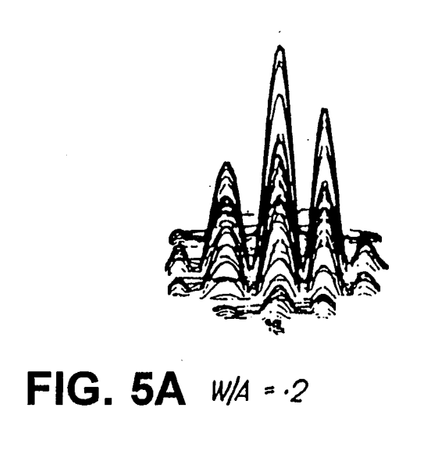
Figure 5B:
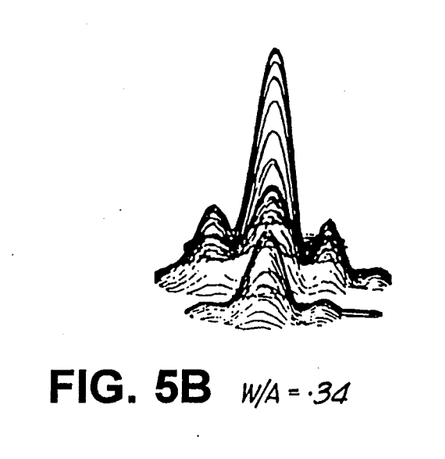
Figure 5C:
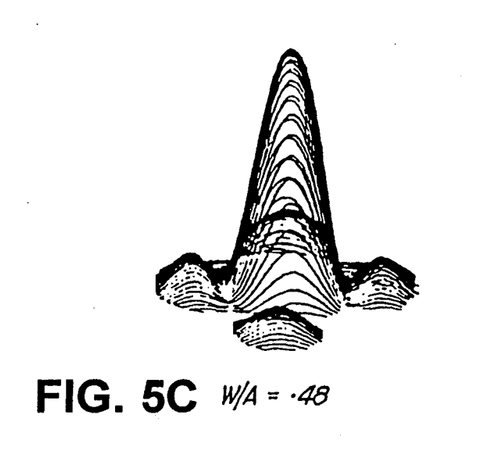
Figure 5D:
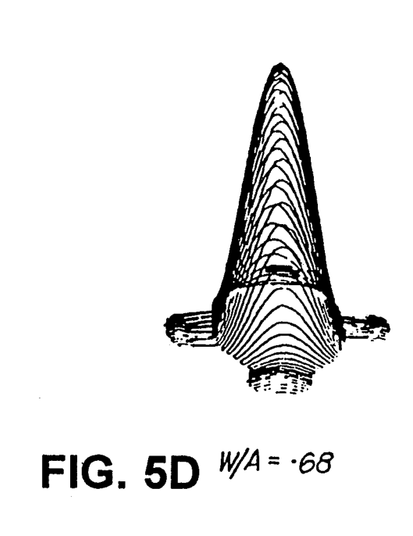
Figure 5E:
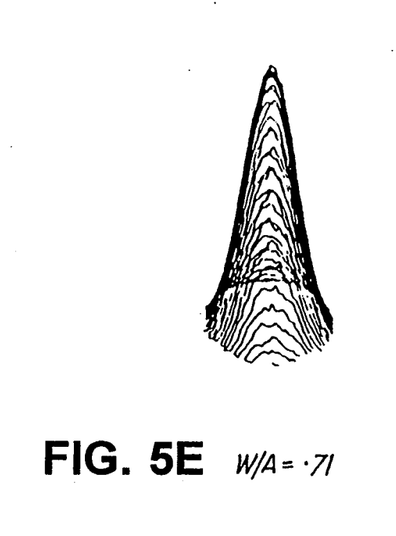
Figure 5F:
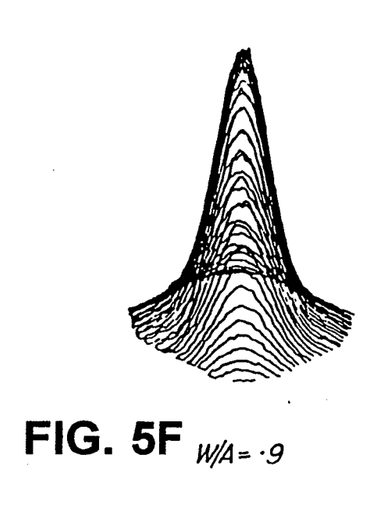
Figure 5G:
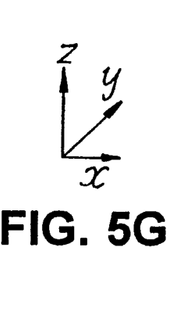

Referring now also to FIG. 4, the variation of intensity coupling coefficients ($I_{mn}$), for various square waveguide $EH_{mn}$ modes, with variation in the ratio of Gaussian beam waist radius to waveguide hall width (w/a) is illustrated graphically. The Gaussian beam waist radius w is measured (as is normal) between two points in the plane of interest, one point being that of maximum beam intensity and the other being that at which the intensity of the beam has fallen to $1/e^2$ of its maximum value. Curve 70 illustrates the intensity coupling coefficient $I_{11}$ of the mode $EH_{11}$. Curve 72 illustrates $I_{13}$ and $I_{31}$ of the modes $EH_{13}$ and $E_{31}$ respectively, these two coefficients varying identically with the ratio w/a. Curve 74 illustrates $I_{33}$ of the mode $EH_{33}$. Further curves, not referenced, illustrate intensity coupling coefficients of higher order modes. From curve 70 it can be seen that with a w/a ratio of 0.71, 98% of the intensity in the Gaussian beam couples into the $EH_{11}$ mode of the square waveguide 54. As the ratio w/a moves away from 0.71, a reducing proportion of the intensity of the light beam 50 couples into the $EH_{11}$ mode of the square waveguide 54. For values of w/a between 0.54 and 0.92, at least 90% of the intensity of the light beam 50 is coupled into the $EH_{11}$ mode. For values of w/a between 0.47 and 1.07 at least 80% of that intensity is coupled into the $EH_{11}$ mode.

Referring now to FIG. 5, there are shown field amplitude distributions within a square waveguide of widthand height $2a$ for various values of the ratio w/a. These were obtained by computation, and are shown as graphs (a) to (f) in quasi-three dimensional form. The relevant co-ordinate axes are indicated at (g). The graphs (a) to (f) correspond to the following values of w/a; (a) 0.2, (b) 0.34, (c) 0.48, (d) 0.68, (e) 0.71 and (f) 0.9. Graph (e) therefore illustrates the excitation of substantially only the fundamental $EH_{11}$ mode of the square waveguide 54. Graphs (a) to (d) and (f) display more complex structures of electric field distributions clearly indicating contributions from higher order modes.

Referring to FIG. 1 once more, input radiation is supplied to the beamsplitter 10 with a beam waist radius w chosen to provide a value of w/a of 0.71. Here a is the half height of the rectangular waveguide 14. The beam 34 supplies an excitation which is coupled to the various $EH_{mn}$ modes of the rectangular waveguide 14. The input Gaussian consequently becomes decomposed into a linear combination of the $EH_{mn}$ modes with respective complex multiplicative amplitude coupling coefficients $A_{mn}$. For the case of excitation of the rectangular waveguide modes $EH_{mn}$ by a fundamental mode $EH_{11}$ of a square waveguide the coefficients $A_{mn}$ are given by:

$$EH_{11} = \Sigma A_{mn} \cdot EH_{mn} \quad (4)$$

It has been found that the excitation of a rectangular waveguide by a Gaussian profile light beam with a beam waist/waveguide size ratio of w/a=0.71 closely approximates to a fundamental $EH_{11}$ mode. In consequence, the amplitude coupling coefficients $A_{mn}$, given by equation 4, are a good approximation to the corresponding Gaussian coefficients. Essentially the $A_{mn}$ coefficients are the coefficients of a Fourier series which represents the electric field at the input aperture 22. The $EH_{mn}$ modes are mutually orthogonal, and in consequence the coefficients $A_{mn}$ can be calculated from overlap integrals of the form:

$$A_{mn} = \int_{-b}^{+b} \int_{-a}^{+a} EH_{11} \cdot EH_{mn} \cdot dy \cdot dx \quad (5)$$

Figure 6:
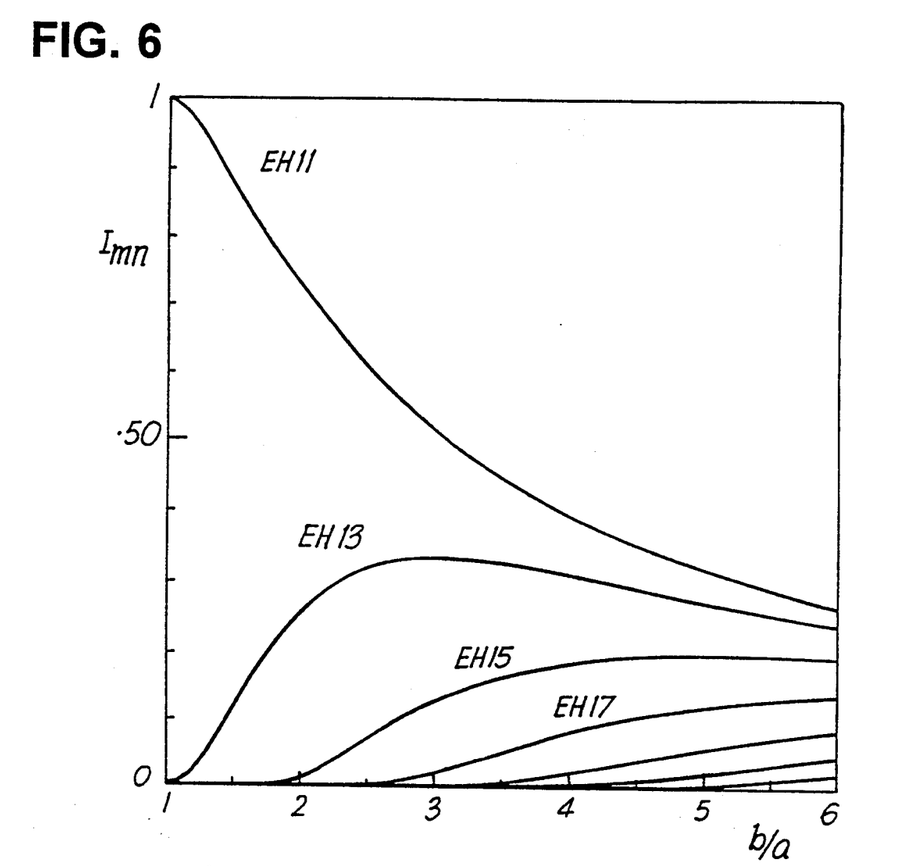
FIG. 6 graphically illustrates the variation of intensity coupling coefficients, for several rectangular waveguide $EH_{mn}$ modes, with variation in the aspect ratio of the waveguide.
Figure 7A:
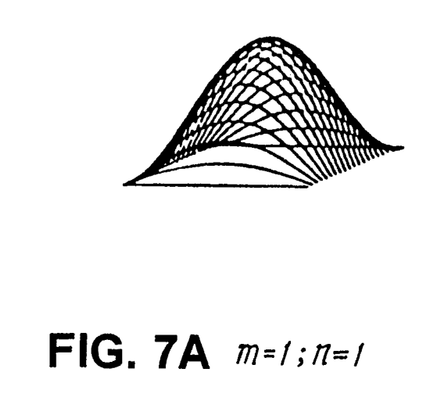
FIG. 7 shows field amplitude distributions for various lower order rectangular waveguide modes.
Figures 7B, 7E:
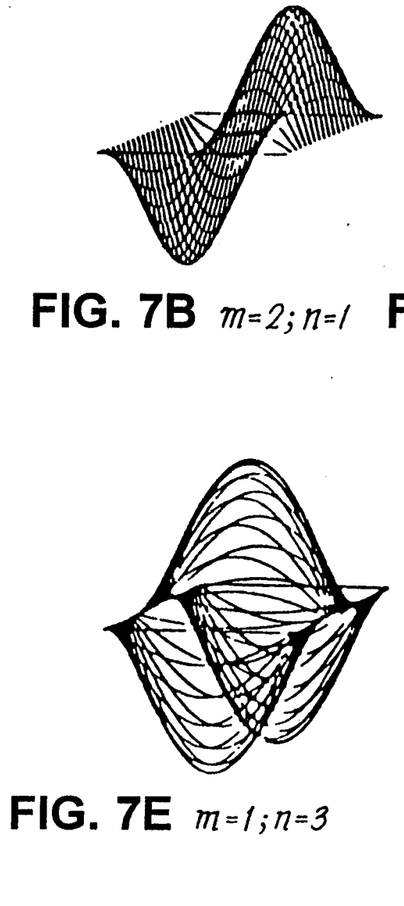
Figure 7C:
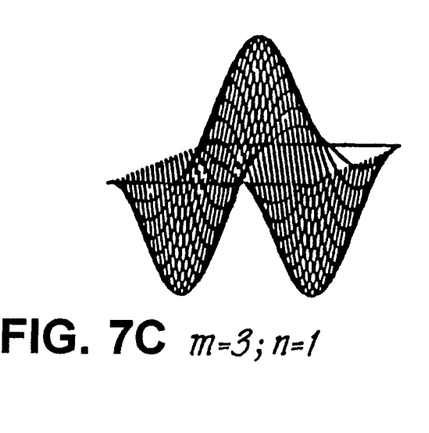
Figure 7D:
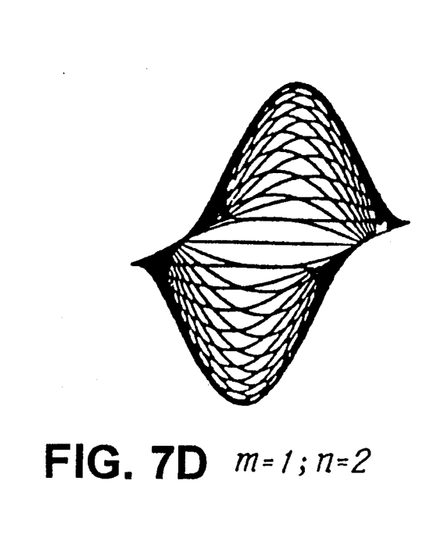
Figure 7F:
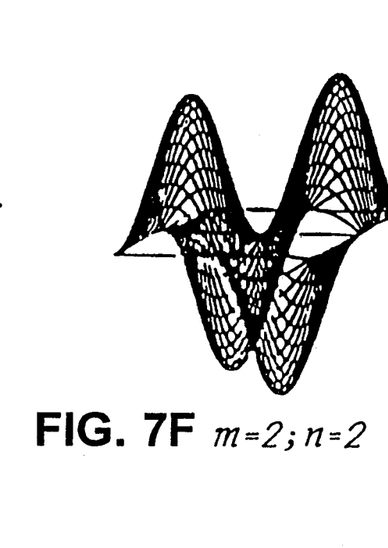
Figure 7G:
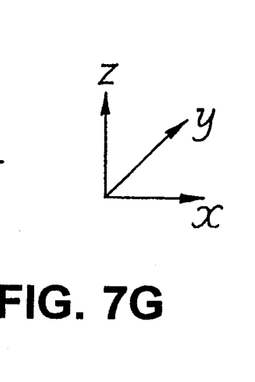

From Equations (2) to (5) it is possible to calculate how the intensity coefficients $I_{mn} = |A_{mn}|^2$ of the excited rectangular guide modes vary as a function of b/a, the ratio of the widths of the central and input waveguides. FIG. 6 illustrates the variation of $I_{mn}$ with b/a; ie the effect of varying the waveguide aspect, or width to height, ratio. FIG. 6 indicates that $I_{mn}=0$ except when m=1 and n is odd. This is because of the symmetric nature of the excitation conditions. Consequently, the modes excited are only the odd-numbered symmetric modes $EH_{11}$, $EH_{13}$, $EH_{15}$ etc of the rectangular waveguide 14.

The forms of some of the lower order $EH_{mn}$ waveguide modes are shown as electric field amplitude distributions in FIG. 7. These were obtained by computation, and are shown as graphs (a) to (f) in quasi-three dimensional form. The coordinate axes are shown at (g). The axes x, y and z correspond to transverse vertical, transverse horizontal and longitudinal directions in the multimode waveguide 14 as before. The graphs (a) to (f) correspond to modes as follows:

(a):$EH_{11}$; (b):$EH_{21}$; (c):$EH_{31}$;
(d):$EH_{12}$; (e):$EH_{13}$; (f):$EH_{22}$.

Of these, (a), (c) and (e) are symmetric modes and (b), (d) and (f) are antisymmetric modes. To clarify this, let $E(x)$ and $E(-x)$ respectively be the electrical field amplitude distributions associated respectively with positive and negative parts of the x axis in FIG. 1; $E(x=0)$ is on the z axis. Let $E(y)$ and $E(-y)$ be the equivalents for the y axis.

For a symmetric mode:

$$E(x) = E(-x) \text{ and } E(y) = E(-y) \quad (6.1)$$

For an antisymmetric mode, either one of or both of (6.2) and (6.3) below apply:

$$E(x) = -E(-x) \quad (6.2)$$

$$E(y) = -E(-y) \quad (6.3)$$

In the beamsplitter 10, the on-axis symmetric input provides for only symmetric modes of the waveguide 14 to be excited.

The transverse electric field distribution in an xy plane distant z from the input aperture 22 is $E_z$ given by:

$$E_z = \Sigma A_{mn} \cdot EH_{mn} \quad (7)$$

Figure 8:
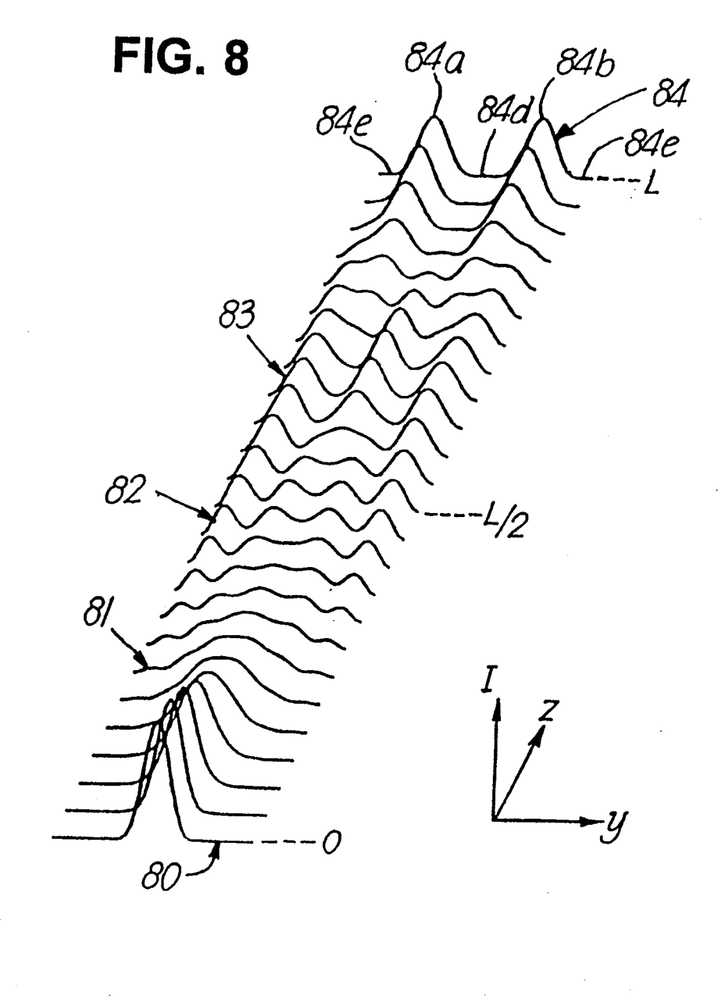
FIGS. 8 an 9 illustrate variation in electric field intensity distribution as a function of position along multimode waveguides with aspect ratios of 3 and 6 respectively.
Figure 9:
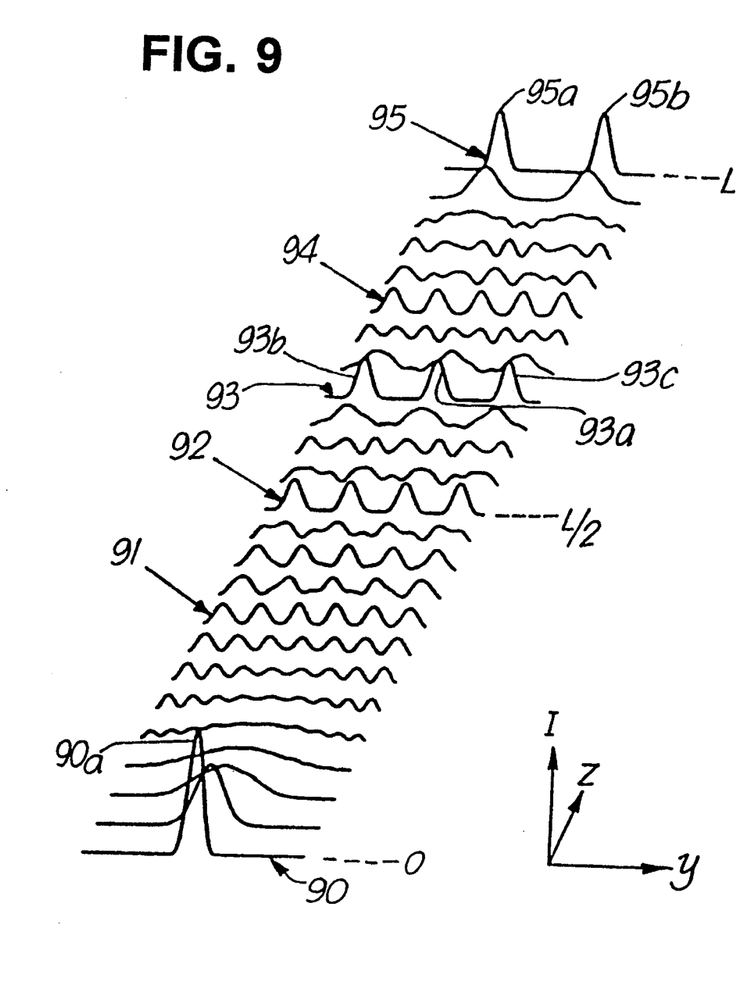

The field intensity distribution in xy planes distant z from the input aperture 22 is $|E_z|^2$, the square of the modulus or magnitude in Equation (7). $|E_z|^2$ has been computed as a function of distance z along the waveguide 14 for two values of b/a. In both cases, the waveguide width ($2b$) was 3 mm, and its height ($2a$) was 1 mm in one case and 0.5 mm in the other. This corresponds to b/a=3 and b/a=6, and the computation results are given graphically in FIGS. 8 and 9 respectively. FIGS. 8 and 9 give the field intensity $I = |E_z|^2$ as a function of position y across the waveguide 14 for each of a series of values of z along this waveguide. In both cases the computation was based on a radiation wavelength of 10.59 microns ($CO_2$ laser) and an active waveguide length L of 425 mm given by Equation (1).

As illustrated in FIG. 6, when b/a=3, only the modes $EH_{11}$, $EH_{13}$, $EH_{15}$ and $EH_{17}$ are excited, and these have approximate relative powers 0.32, 0.33, 0.13 and 0.02 respectively. When b/a=6, the modes $EH_{11}$ to $EH_{1,13}$ are excited with respective relative powers from 0.27 to 0.02.

In FIG. 8, an initial central maximum 80 indicates the electric field intensity distribution I at the input aperture 22 in FIG. 1. At this point (z=0), the modes $EH_{11}$ to $EH_{17}$ give rise to electric fields which are in phase with one another and interfere constructively to produce the maximum 80. Moving down the length of the waveguide 14, ie as z increases, the modes $EH_{11}$ to $EH_{17}$ move out of phase with one another. This is a consequence of Equations (2) and (3), in which the phase coefficient $\beta_{mn}$ and therefore also the propagation constant $\gamma_{mn}$ are dependent on the mode numbers m and n.

The spatial rates of change of these modal electrical field contributions therefore differ along the z axis, ie axially of the waveguide 14. This changes the form of the interference between modal field contributions, and gives rise to a variety of electric field intensity distributions extending transversely. The distributions are indicated by curves such as 81 and 82 in xy planes at respective values of z. Approximately two thirds of the distance down the waveguide 14, the intensity distribution is given by a curve 83 having three similar maxima. A distance L along the waveguide 14, the intensity distribution is shown as a curve 84 having two well separated maxima 84a and 84b. The maxima 84a and 84b are located at the centres of the input apertures 30 and 32 of the output fibres 26 and 28. They are in phase with one another, and each excites the fundamental mode of the respective output fibre 26 or 28 associated with it.

Calculations show that there is efficient coupling of radiation from the light beam 34 to the waveguide 14 as indicated by the curve 80, and from the waveguide 14 to the output fibres 26 and 28 as indicated by the curve 84. The curve 84 goes to zero in sections 84c, 84d and 84e. The maxima 84a and 84b excite fundamental modes of respective output fibres 26 and 28, there is no mismatching to generate waves reflected towards the input aperture 22. Assuming therefore that the attenuation along the waveguide 14 and fibres 26 and 28 is insignificant, ie that $\alpha_{mn}$ for m=1 and n=1,3,5 and 7 is negligible, then radiation in the input light beam 34 is efficiently and equally coupled to both output fibres 25 and 28. The beamsplitter 10 therefore has good beamsplitting properties when b/a is 3.

Turning now to FIG. 9, this shows transverse electric field distributions along the length of the waveguide 14 when its cross-sectional aspect ratio b/a is 6, as previously mentioned. As indicated in FIG. 6, the effect of increasing b/a from 3 (as in FIG. 8) to 6 (as in FIG. 9) is to reduce power coupled to rectangular waveguide modes $EH_{11}$ and $EH_{13}$ and increase power coupled to modes $EH_{15}$ to $EH_{1,13}$. Since higher order modes receive more power, the degree of structure and definition in FIG. 9 is increased over that in FIG. 8. In FIG. 9, the field distribution in the plane of the aperture 22 is indicated by a curve 90 with a single maximum 90a. As before, due to the modes $EH_{11}$ to $EH_{1,13}$ having differing $\beta_{mn}$ values, the transverse intensity distributions change with distance z along the waveguide 14. Curves 91 to 95 indicate locations at which there is field intensity division into multiple maxima of substantially equal form and magnitude. The curves 91, 92, 93, 94 and 95 have six, four, three, five and two maxima respectively. Curve 93 in particular has three well defined maxima 93a, 93b and 93c. The curves 91 to 95 are located at distances from the waveguide input aperture 22 of L/3, L/2, 2L/3, 4L/5 and L respectively, where L is the active waveguide length as has been said. These lengths can be expressed as 2L/6, 2L/4, 2L/3, 4L/5 and 2L/2. Accordingly, there is an inverse relationship between number of maxima and distance. It can be shown that the minimum length $L_K$ at which splitting into K maxima occurs is 2L/K, ie $4b^2/\lambda K$.

The waveguide 14 has output fibres 26 and 28 positioned to receive radiation from maxima 95a and 95b of the curve 95. An alternative device might employ a shorter waveguide and have a set of output fibres positioned at respective maxima of one of the curves 91 to 94. This would provide one to N way beamsplitting, where N=6, 4, 3 or 5. It is also possible to have multiple inputs and outputs for M to N way radiation beam splitting. For example, three inputs may be positioned with centres at the locations of maxima on curve 93, and five outputs may be taken from positions at the equivalent on curve 94. However, as will be described later, the phases of the electric fields contributed by the inputs would be required to differ. Whereas the maxima 90a, 95a and 95b correspond to electric fields which are in phase, in general the maxima on a curve such as 91 are not in phase with one another.

If multiway radiation beam splitting is required, it is necessary to have a sufficiently large value of b/a to ensure adequate separation of the maxima at the fibre input apertures. A sufficiently high value of b/a ensures that enough symmetric $EH_{mn}$ modes (m=1, n=1,3,5 ...) are excited to produce well defined maxima with intervening zero intensity. This is a matter of design for individual applications. It is however an advantage that the invention requires relatively few modes to be excited, eg six. Prior art self-imaging guides require fifty more modes; in consequence, they require either increased waveguide size or high refractive index core media to preserve total internal reflection at high mode numbers.

Figure 10:
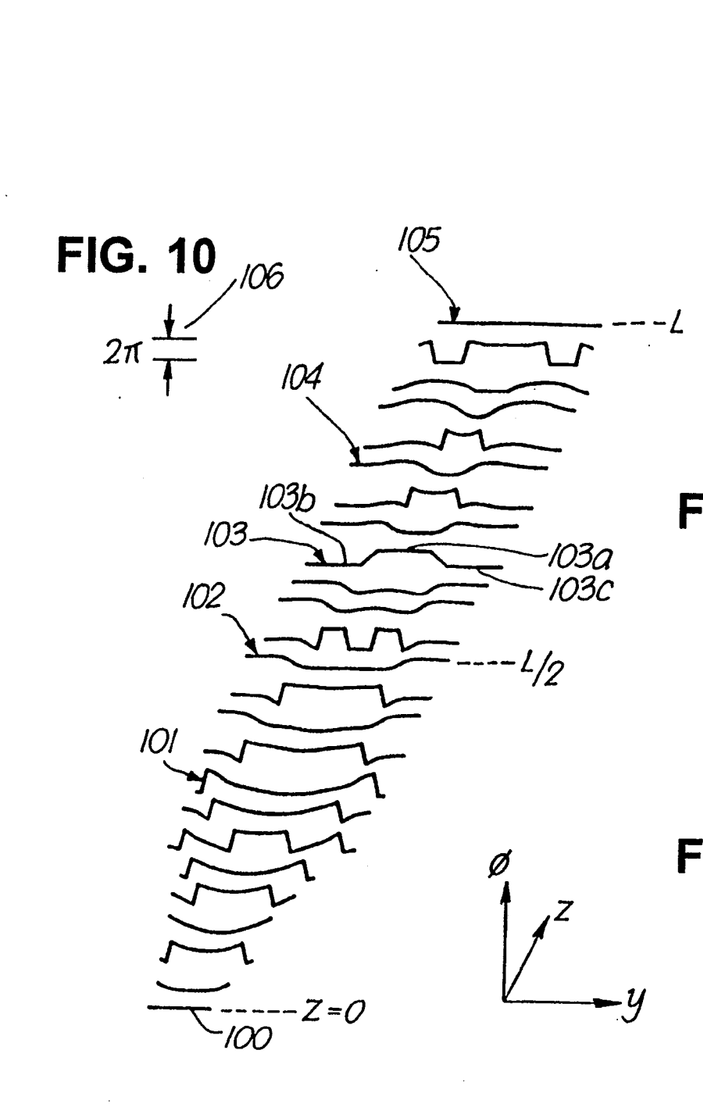
FIG. 10 provides the phase variation along each of the intensity distributions in FIGS. 8 or 9.

FIG. 10 shows the variation along the y axis of the phase $\phi$ of the resultant electric field for the waveguide dimensions from which FIG. 9 was derived. Curves such as 100 to 105 are shown, which correspond to curves 90 to 95 respectively. Each of the phase curves such as 101 indicates the phase variation of the electric field across the waveguide 14 for a respective value of z, and corresponds to a respective intensity distribution in FIG. 9. The vertical scale of the phase representation $\phi$ is shown at 106, where an interval of $2\pi$ is indicated. The field distributions at 90 and 95 are of constant phase as indicated by straight lines 100 and 105. However, curve 103 for example has a central region 103a which differs in phase to its two outer regions 103b and 103c. The regions 103a to 103c give the phases of associated maxima 93a to 93c in FIG. 9. In consequence, the central maximum 93a is out of phase with the outer maxima 93b and 93c, which are in phase with one another. This indicates that a "three to two" beam combiner/splitter would require a central maximum 93a shifted phase with respect to outer maxima 93b and 93c in order to generate two in-phase maxima 95a and 95b.

Since curves 100 and 105 are in phase, they produce reversible properties; ie two in-phase inputs 95a and 95b would give rise inter alia to one output 90. Extending this, two waveguides 14, each of length L, placed end to end would convert maximum 90 to maxima 95a/95b and then back to maximum 90 once more. This can be visualised by considering two versions of FIG. 9 in series with maxima 95a/95b superimposed. The double length of waveguide thus created is 2L long, which, from Equation (1), is given by:

$$2L = 4b^2/\lambda \qquad (8)$$

Equation (8) gives the symmetric mode repeat distance, this being the length of rectangular waveguide over which an initial electric field distribution will be recreated. It assumes the absence of significant attenuation of the relevant symmetric $EH_{mn}$ waveguide modes in the course of propagation of radiation along the waveguide.

The visualisation of two versions of FIG. 9 back to back combined with the like for FIG. 10 illustrates the effects of optical phase. For example, the single maximum 90 and corresponding in-phase curve 100 convert to four maxima 92 with phase variation at a distance L/2. These maxima 92 convert to two in-phase maxima 95a/95b at a distance L/2, and to a single maximum at a distance 3L/2.

FIGS. 8, 9 and 10 relate to specific values of b/a. More generally, for the beamsplitter 10 of FIGS. 1 and 2, only modes $EH_{1n}$ are excited because of the $EH_{11}$ symmetry of the excitation from the input light beam 34. At the waveguide input aperture 22, the phase is constant. For the case involving arbitrary b/a values, using Equation (3) the phase coefficient $\beta_{1p}$ of mode $EH_{1p}$ is given by:

$$\beta_{1p} = \frac{2\pi}{\lambda}\left[1 - \frac{1}{2}\left(\left(\frac{\lambda}{4a}\right)^2 + \left(\frac{\lambda p}{4b}\right)^2\right)\right] \quad (9)$$

and the phase coefficient $\beta_{1q}$ of mode $EH_{1q}$ is given by:

$$\beta_{1q} = \frac{2\pi}{\lambda}\left[1 - \frac{1}{2}\left(\left(\frac{\lambda}{4a}\right)^2 + \left(\frac{\lambda q}{4b}\right)^2\right)\right] \quad (10)$$

By subtraction of Equation (10) from Equation (9) and rearranging, the phase difference between modes $EH_{1p}$ and $EH_{1q}$ at guide length z is $X_z$ given by:

$$\chi_z = \beta_{1p} - \beta_{1q} = \frac{\pi \cdot \lambda \cdot z}{16 \cdot b^2} \cdot (p^2 - q^2) \quad (11)$$

If the condition is imposed that a $2\pi$ phase difference exist between the modes, Equation (11) becomes:

$$\chi_z = \frac{\pi \cdot \lambda \cdot z}{16 \cdot b^2} \cdot (p^2 - q^2) = 2\pi \quad (12)$$

and the propagation distance z (say $z_{2\pi}$) in Equation (12) in rectangular waveguide that gives rise to a $2\pi$ phase difference between modes $EH_{1p}$ and $EH_{1q}$ is given by:

$$z_{2\pi} = \frac{32 \cdot b^2}{(p^2 - q^2) \cdot \lambda} \quad (13)$$

For the case of the $EH_{11}$ and $EH_{1n}$ modes (i.e the fundamental and $n^{th}$ highest order odd mode) $z_{2\pi}$ is given by $$z_{2\pi} = \frac{32 \cdot b^2}{(n^2 - 1) \cdot \lambda} \quad (14)$$

Combining Equations (2) and (14):

$$z_{2\pi} = \frac{16L}{(n^2 - 1)} \quad (15)$$

With n=3,5,7,9,11 ... $16L/n^2-1$) $z_{2\pi}$ is 2L, 2L/3, L/3, L/5, 2L/15 ... As fractions of a propagation distance 2L in rectangular waveguide which results in the $EH_{11}$ and $EH_{13}$ modes being back in phase, the relative length ratios are 1, 1/3, 1/6, 1/10, 1/15 etc. This shows that there is a harmonic relationship between the $EH_{1n}$ modes of the rectangular guide. Equation (4) shows that the propagation distance $z_{2\pi}$ which gives rise to a $2\pi$ phase shift between the fundamental $EH_{11}$ mode and the next highest order $EH_{13}$ mode also gives rise to a $2\pi$ phase shift between the fundamental and all other $EH_{1n}$ modes (n odd). This results in reproduction of any symmetric input electric field after a distance $z_{2\pi}$, provided that there is only excitation of odd $EH_{1n}$ modes; i.e a circularly symmetric field is not a requirement. A symmetric input field is also produced periodically at distances of $tz_{2\pi}$, where "t" is an integer number if there is sufficient length of rectangular waveguide available.

Equations (12) to (15) may be rewritten to determine $z_\pi$, the propagation distance in rectangular waveguide over which an intermode phase change of $\pi$ is introduced. By inspection of these equations, it is seen that:

$$z_\pi = \tfrac{1}{2}z_{2\pi} = 8L/(n^2-1) \quad (16)$$

L and 2L are the waveguide lengths over which $z_\pi$ and $z_{2\pi}$ are introduced, and $L=2b^2/\lambda$ from Equation (1). In consequence, $z_\pi$ and $z_{2\pi}$ are both proportional to $b^2$, and may be arranged to occur at prearranged distances along a rectangular waveguide by suitable choice of the waveguide width. The foregoing analysis was verified experimentally, using the device of FIGS. 1 and 2, as follows. The rectangular waveguide 14 had dimensions 1.5 mm (width 2b) by 0.6 mm (height 2a) by 212 mm (length 2L), and was constructed of alumina. This length is $4b^2/\lambda$ for a $CO_2$ laser wavelength of 10.59 microns. The input light beam 34 was provided by a $CO_2$ laser focused to a beam waist diameter (2w) of 0.42 mm on the z axis (x=0, y=0), the beam being directed along this axis.

Figure 11A:
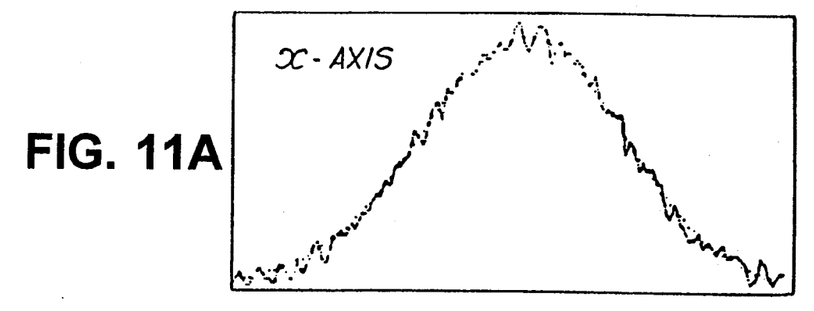
FIG. 11 shows beam profiles from the pyroelectric vidicon camera for the case where input field regeneration is achieved.
Figure 11B:
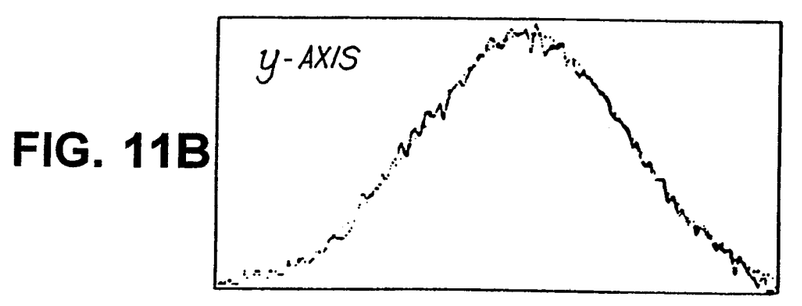

Before the output fibres 26 and 28 were positioned in the waveguide 14, a pyroelectric ridicon camera was used to detect output from the rectangular waveguide 14. FIG. 11 shows, as solid lines, beam profiles from the camera output, and, as dotted lines, the best Gaussian fits to those profiles, along a) the x-axis and b) the y-axis. FIG. 11 confirms that radiation output from the waveguide 14 was equivalent in intensity distribution to radiation input translated by 212 mm, the waveguide length; i.e the input had been recreated with an axial displacement equal to 2L or $4b^2/\lambda$. The overall transmission of intensity was 82% of that input. This indicated a high transmission efficiency by the waveguide 14, since the losses of 18% were small. The measurements verified that an input electric field distribution would be recreated by a rectangular waveguide at a propagation distance $4b^2/\lambda$, where b was the waveguide width dimension responsible for multimode effects.

Figure 12:
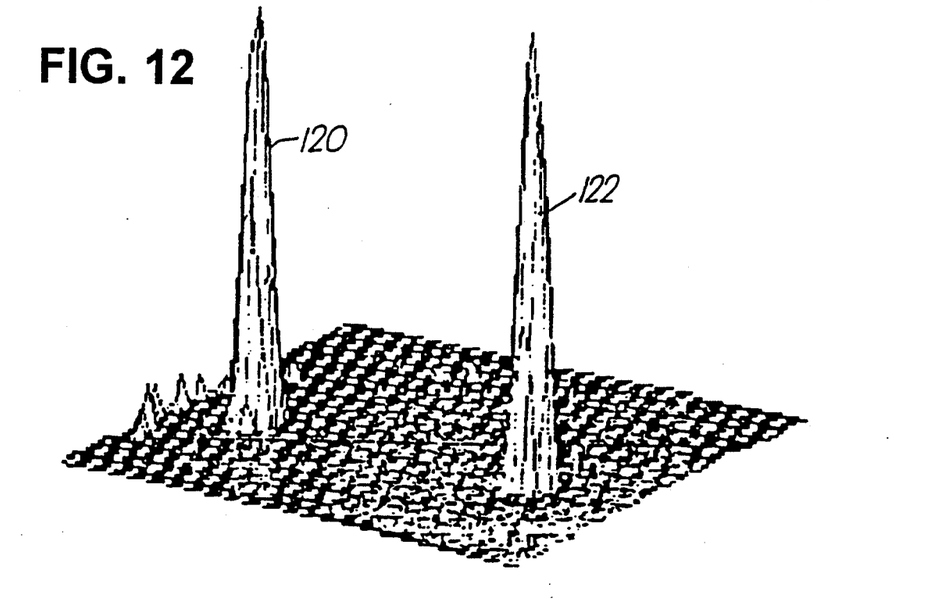
FIG. 12 shows quasi three-dimensional profiles of the beams emerging from output optical fibres following field splitting in a rectangular multimode waveguide.

Next two hollow core optical fibres, 26 and 28, (with 0.53 mm internal diameter) were inserted into the rectangular waveguide 14 and positioned as in FIG. 1. The fibre input apertures 30 and 32 were therefore a distance $L=2b^2/\lambda=106$ mm from the $CO_2$ laser beam waist 36. The pyroelectric vidicon camera was employed to detect output from the fibres 26 and 28. FIG. 12 shows the camera output in a quasi three dimensional form, outputs from fibres 26 and 28 being represented by peaks 120 and 122 respectively. The peaks 120 and 122 illustrate that the fibre outputs were equal in amplitude and in intensity distribution, which was circularly symmetric in both cases. This proved that an equal amplitude fundamental mode splitting of the input radiation had occurred in a length $L=2b^2/\lambda$ of rectangular waveguide. The fibres were subsequently placed side by side to produce overlap between their outputs. This created well defined interference fringes.

Measurements were made of the input power to the rectangular waveguide 14 and that output from the fibres 26 and 28. By allowing for attenuation losses in the waveguide 14 and fibres 26 and 28, it was calculated that the process of beamsplitting was 75% efficient. The 25% loss was attributed to fibre misalignment and incorrect sizing, together with imperfect input field distribution. Such losses may be reduced by improved alignment, and use of more suitable fibres. Despite this, the beamsplitting effect was demonstrated at waveguide length L to add to the earlier demonstration of input reconstitution at waveguide length 2L.

The loss of 25% described above compares very favourably with prior art Y-junctions. In such devices splitting losses of 75% are typical. When insertion losses are also taken into account efficiency of a few percent is all that is normally achieved.

The waveguide 14 of beamsplitting device 10 may be constructed of materials other than alumina, eg BeO, Si, Macor or metal. The fibres may also be constructed of materials other than silica. Furthermore, the fibres 26 and 28 may be replaced by other forms of waveguide. For instance, a device of the invention may incorporate square section waveguides of side $2a$ with the sides parallel to the x and y axes, or with sides at 45° to the x and y axes, or elliptical guides with the major and minor axes parallel to the x and y axes. Other shapes such as diamond or octagonal guides may also be used.

Outputs from the beamsplitter 10 may be taken as Gaussian free space beams in place of guided beams. A waveguide fundamental $EH_{11}$ mode couples into a free space Gaussian $TEM_{oo}$ mode with high efficiency. Of the order of 98% of the energy of a $EH_{11}$ mode will couple into a $TEM_{oo}$ mode.

Other forms of output means may also be employed. These may for instance be active devices, such as detectors, positioned appropriately such that the output radiation is incident on them. Alternatively optical systems incorporating lenses, gratings, prisms etc may receive the output radiation.

The foregoing description with reference to FIGS. 1 to 12 demonstrates that beamsplitting is achievable in the width dimension of a rectangular waveguide. For example, in FIG. 9 the maxima 95a and 95b are spaced apart along the y axis across the waveguide width. If the waveguide is constructed with sufficient height, then it is possible to achieve multiway splitting in the x dimension in addition to that previously described. In particular, a central square cross-section waveguide of height and width $2b=4a$ and length L will convert an input waveguide fundamental $EH_{11}$ mode or other input closely approximating to this, on—axis at one end to four in-phase fundamental mode outputs at the other end. These outputs will be centered at points in the x, y plane at z=L given by (b/2, b/2), (b/2, −b/2), (−b/2, −b/2) and (−b/2, b/2); here x =y=0 is on the longitudinal symmetry axis of the waveguide. In this instance, two dimensional waveguide modes $EH_{mn}$ (m,n,=1,3,5 . . .) are excited instead of only the one dimensional equivalent (m=1, n=1,3,5 . . .) of FIGS. 1 to 12. Consideration of two versions of FIG. 9 at right angles to one another indicates that more complex splitting is possible with appropriate location of inputs and outputs and phase control as per FIG. 10.

The foregoing remarks regarding square waveguides are extendable rectangular waveguides. As previously stated, beam division into intensity maxima in a waveguide width dimension of width $2b$ occurs at distance $L_K$ given by:

$$L_K = 4b^2/\lambda K \tag{17}$$

If the waveguide has an orthogonal width dimension of width $2a$ in which splitting into J intensity maxima is required, this will occur at a length $L_J$ given by:

$$L_J = 4a^2/\lambda J \tag{18}$$

If simultaneous splitting into J and K intensity maxima is required in the same length of waveguide, the waveguide cross-section dimensions b/a will be given by equating $L_J$ and $L_K$ and taking the square root as follows:

$$b/a = \sqrt{(K/J)} \tag{19}$$

In consequence, splitting into a nine by four array of intensity maxima will occur in a rectangular waveguide with b equal to 3a/2 at a distance of $a^2/\lambda$.

A theoretical discussion similar to that above can be used to show that asymmetric embodiments of the invention may also be constructed. In such embodiments the input is off-set from the axis of the waveguide. Consequently antisymmetric $EH_{mn}$ modes (m and/or n even) are excited in addition to, or in place of, symmetric modes. The distribution of modes excited depends, as above, on the dimensions of the waveguide, and on the location of the input beam waist. Such devices may, for instance, be constructed to provide a plurality of outputbeams of different intensities.

Devices of the invention may be constructed which perform beam combining and mixing functions. The input to such devices may include two or mot Gaussian $TEM_{oo}$ modes. The function of the devices will be determined the length of the multimode waveguide section, and the number, phase and positioning of input beams.

Figure 13:
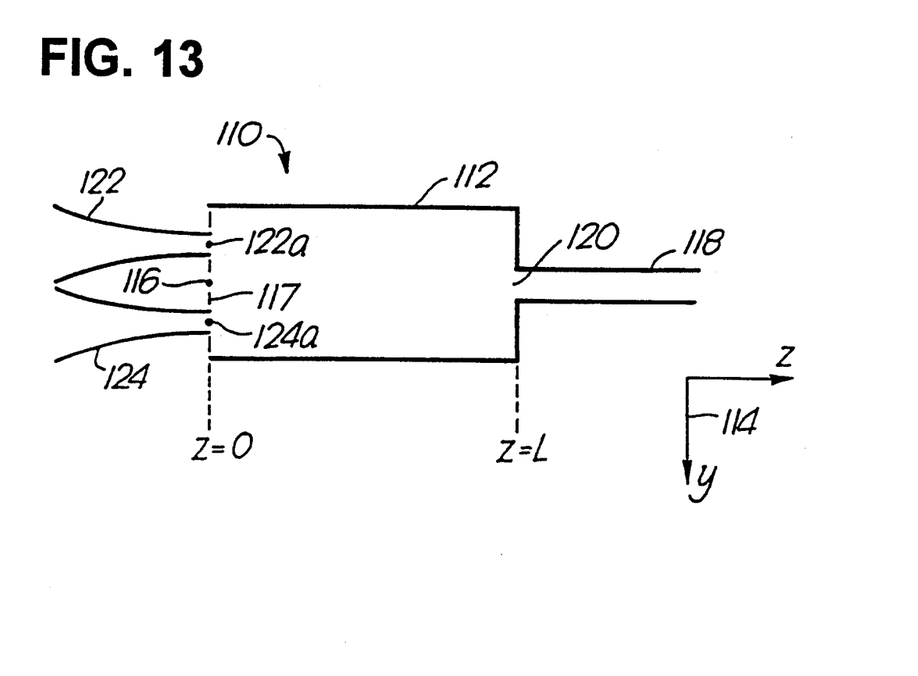
FIG. 13 is a sectional plan view of an optical device of the invention in the form of a beam combiner.

Referring now to FIG. 13 a device of the invention in the form of a beam combiner is illustrated schematically. The device is indicated generally by 110, and it incorporates a rectangular waveguide 112 of width $2b$, height $2a$ and length $L=2b^2/\lambda$. Relevant coordinate axes are indicated at 114, and the origin is indicated by 116. The device 110 has an input aperture 117 indicated by a chain line through the origin 116. It also incorporates a square cross section waveguide 118 of width and height $2a$. The square waveguide 118 is coaxial with the rectangular waveguide 112 and has an aperture 120 located in the plane z=L.

Two Gaussian $TEM_{oo}$ mode input beams 122, 124 are supplied from input means (not shown) such that their respective axes are parallel to the z-axis indicated at 114. They have respective beam waists 122a and 124a in the input aperture 117, the beam waist centres being located at y values of −b/2 and +b/2 respectively. The input beams 122 and 124 provide excitations which are substantially equivalent to two square waveguide fundamental modes input at the same locations, provided the beam waists are selected appropriately, as discussed earlier. The dimensions of the rectangular waveguide 112, and the positions of the inputs 122, 124 are such that when the inputs 122, 124 are in phase they are combined to form a single output beam which enters the square waveguide 118 via the aperture 120. The effect of the phases of input beams is discussed in more detail below.

Figure 14:
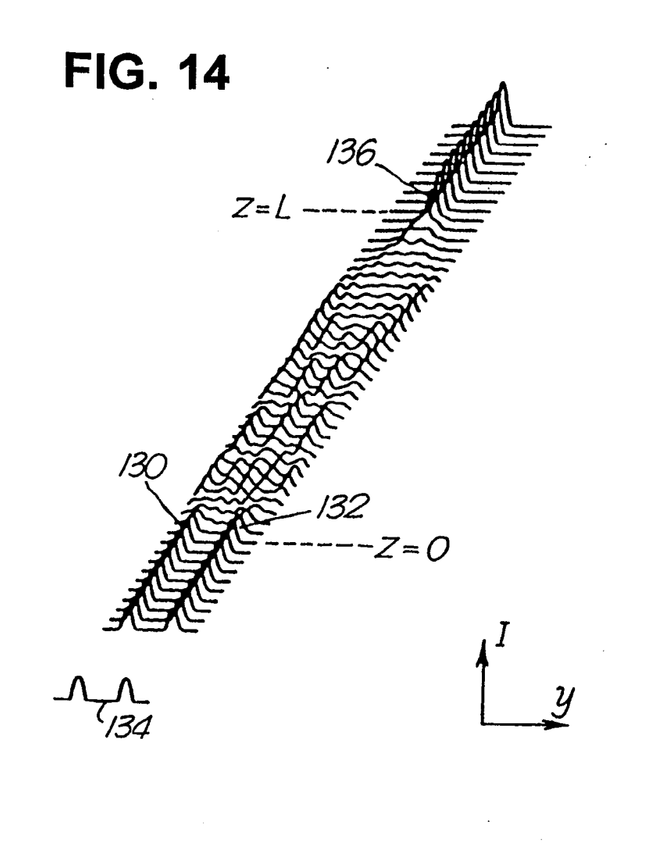
FIGS. 14 and 15 illustrate variation in electric field intensity distribution as a function of position along a multimode waveguide for two inputs in phase and in antiphase respectively.
Figure 15:
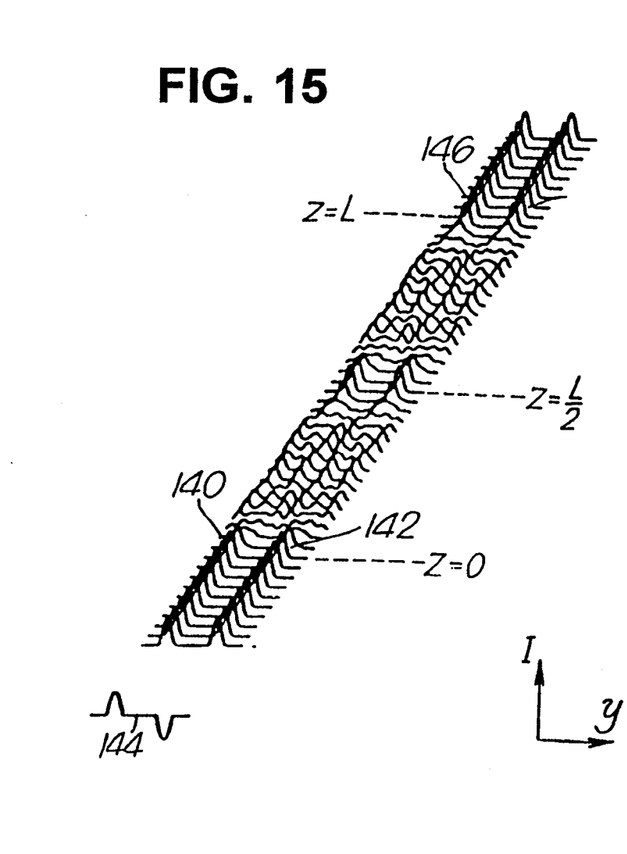

Referring now to FIGS. 14 and 15, the variation of electric field intensity distribution I with distance along a multimode waveguide is illustrated. These drawings relate to two equal intensity waveguide input beams which are in-phase and in anti-phase with one another respectively. In FIG. 14, two initial maxima 130 and 132 indicate the electric field intensity distribution I at z=0. They are positioned on the y-axis −b/2 and +b/2 respectively.

The relative phases of the maxima 130 and 132 are indicated at 134. The are in phase with one another. As for beam splitting, modal dispersion occurs in the waveguide and after a length L (ie at z=L) a single maxima 136 is produced, positioned on the y-axis at y=0. In FIG. 15, two initial maxima 140 and 142 indicate the electric field intensity distribution I at z=0. They are positioned at y=−b/2 and y=+b/2 respectively. The relative phases of the maxima 140 and 142 are indicated at 144. They are in antiphase with one another. Again modal dispersion occurs in the waveguide, but after a length L (ie at z=L) two maxima 146 and 148 are produced. They are positioned on the y-axis at −b/2 and +b/2 respectively. Thus the input electric field intensity distribution has been reproduced after a length L of waveguide. For phase conditions intermediate the two extremes illustrated in FIGS. 14 and 15, three output maxima will be produced at z=L. The respective amplitudes will be dependent on the relative phases of the inputs. The resolution of the three output maxima will depend on the width of the rectangular waveguide.

Related situations arise where more than two inputs are involved. The phases of the inputs must be carefully selected to ensure that the output from the device is that which is required. However, the effect of input phase can be employed in devices of the invention in order to obtain a desirable function.

Figure 16:
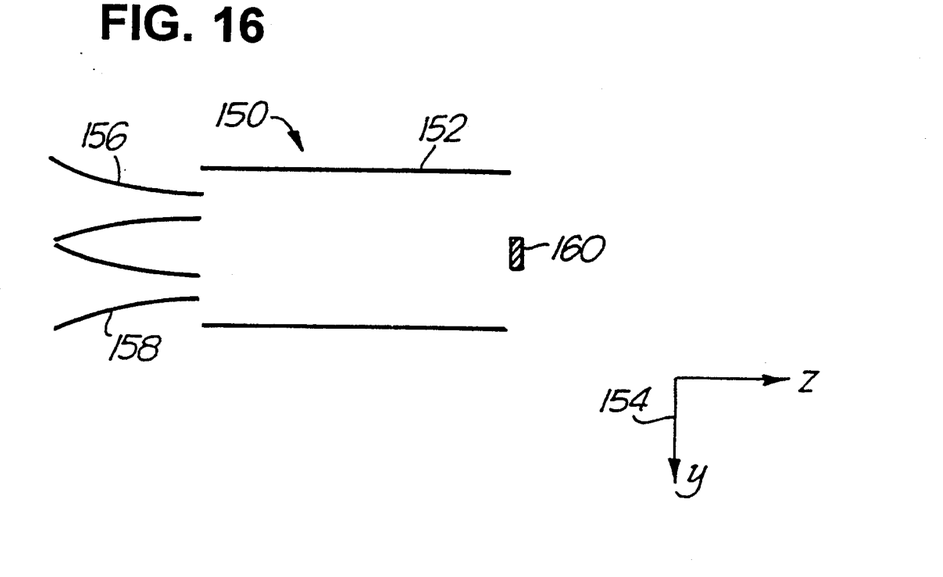
FIG. 16 is a sectional plan view of a device of the invention for use in heterodyne detection.

Referring now to FIG. 16, a device of the invention, for use in heterodyne detection, based on a beam combiner is illustrated schematically. The device is indicated generally by 150. The device 150 incorporates a rectangular waveguide 152, of width 2b, height 2a and length L. The relevant co-ordinate axes are indicated at 154. Two Gaussian intensity profile input beams 156 and 158 are located at y=−b/2 and y=+b/2 and provide a local oscillator signal and a received signal respectively. The received signal may be a signal from a source having undergone reflection or scattering from a target zone. The received signal source may be that of the local oscillator. If the reflection or scattering of the received signal produces a Doppler shift, the input beams 156 and 158 will have a small difference in frequency, and thus wavelength. A detector 160 is positioned with its center at x=0, y=0, z=L.

The device 150 operates as follows. The two inputs 156 and 158 combine to produce a beat or difference frequency. The effect at z=L is that the electric field intensity distribution I varies from a single maximum at x=0, y=0 to two maxima at x=0, y=−b/2 and x=0, y=+b/2. At times between those at which these two conditions occur all three maxima will be produced with differing amplitudes. Therefore the intensity falling on the detector 160 varies between maximum and minimum values at the beat or difference frequency.

Further embodiments, similar to the device 150, for heterodyne detection may be constructed. It may, for instance, be advantageous to have three detectors positioned at x=0, y=0, x=0, y=−b/2 and x=0, y=+b/2. Thus the intensity present in each of the three maxima would be recorded. Alternatively it may be advantageous to employ one detector as in the device 150, and to position absorbers at x=0, y=−b/2 and x=0, y=+b/2, thus ensuring that the energy in the two outer maxima would not be reflected back into a rectangular waveguide equivalent to 152.

More complex optical devices may be constructed by combining two or more of the beamsplitters or beam combiners of the invention. For instance a Mach Zehnder interferometer may be constructed using one beamsplitter and one beam combiner each of the invention and arranged back to back.

We claim:

1. An optical device including input means for providing input radiation and a waveguide arranged to receive the input radiation and to provide for at least a proportion of the input radiation to be directed to output means, wherein:

(a) the input means are arranged to provide at least one input radiation beam of Gaussian intensity profile directed through free space to an input region of the waveguide and (b) the waveguide is a multimode waveguide of rectangular cross-section, and the dimensions of the waveguide together with the position and phase characteristics of the at least one input radiation beam in combination comprise a means for directing the at least one input radiation beam to the output means by virtue of modal dispersion along the path of radiation guided within the waveguide, wherein the input means includes beam waist defining means for providing for input radiation beam waist diameter to be appropriate for efficient excitation of the waveguide.

2. An optical device according to claim 1 wherein the at least one input beam has a beam waist diameter equal to $2w$, the waveguide has a lesser cross-sectional side of length $2a$, and the input beam is matched to the input region by virtue of the ratio $w/a$ being in the range 0.47 to 1.07.

3. An optical device according to claim 2 wherein the ratio $w/a$ is in the range 0.54 to 0.92.

4. An optical device according to claim 1 wherein the output means includes at least one subsidiary waveguides.

5. An optical device according to claim 1 wherein the output means comprises a means for excitation of at least one free space beam of Gaussian intensity profile.

6. An optical device according to claim 1 wherein the output means incorporate at least one active device.

7. An optical device according to claim 6, wherein at least one active device is a detector.

8. An optical device including input means for providing input radiation and a waveguide arranged to receive the input radiation and to provide for at least a proportion of the input radiation to be directed to output means, wherein:

(a) the input means comprises a plurality of input radiation beams of Gaussian intensity profile directed through free space to an input region of the waveguide and (b) the waveguide is a multimode waveguide, and the dimensions of the waveguide together with the position and phase characteristics of the at least one input radiation beam are in combination arranged to provide for the at least one input radiation beam to be directed to the output means by virtue of modal dispersion along the path of radiation guided within the waveguide.

9. An optical device according to claim 8 wherein the input means comprise a means for providing all input radiation to the input region in the form of two beams of Gaussian intensity profile.

10. An optical device including input means for providing input radiation and a waveguide arranged to receive the input radiation and to provide for at least a proportion of the input radiation to be directed to output means, wherein:
  (a) the input means comprises a single input radiation beam of Gaussian intensity profile directed through free space to an input region of the waveguide and
  (b) the waveguide is a multimode waveguide, and the dimensions of the waveguide together with the position and phase characteristics of the single input radiation beam in combination comprise a means for directing the at least one input radiation beam to the output means by virtue of modal dispersion along the path of radiation guided within the waveguide, wherein said optical device is arranged as a beamsplitter, and the output means incorporate a plurality of output apertures comprising a means for receiving respective fractions of input radiation beam intensity.

11. An optical device according to claim 10 wherein the single Gaussian input beam is located centrally with respect to the input region of the waveguide.

12. An optical device including input means for providing input radiation and a waveguide arranged to receive the input radiation and to provide for at least a proportion of the input radiation to be directed to output means, wherein:
  (a) the input means are arranged to provide at least one input radiation beam of Gaussian intensity profile directed through free space to an input region of the waveguide and
  (b) the waveguide is a multimode waveguide, and the dimensions of the waveguide together with the position and phase characteristics of the at least one input radiation beam in combination comprises a means for directing the at least one input radiation beam to the output means by virtue of modal dispersion along the path of radiation guided within the waveguide, wherein the waveguide is of rectangular cross-section and the input means comprises a means for providing input radiation with position and phase characteristics appropriate to excite symmetric modes of the waveguide but not antisymmetric modes thereof.

* * * * *